Dec. 31, 1935.   F. L. CREAGER   2,026,122
PROJECTION WELDING
Filed Aug. 24, 1934

INVENTOR
Frederick L. Creager
BY JR Goldsborough
ATTORNEY

Patented Dec. 31, 1935

2,026,122

UNITED STATES PATENT OFFICE 2,026,122

PROJECTION WELDING

Frederick L. Creager, Camden, N. J., assignor, by mesne assignments, to Radio Corporation of America, New York, N. Y., a corporation of Delaware Application August 24, 1934, Serial No. 741,221

5 Claims. (Cl. 219—10)

My invention relates to improvements in projection welding.

In connecting or securing together two parts by spot or resistance welding, it has been proposed heretofore to provide at least one of the parts with one or more small projections, such as by machining the surface of the part or parts. The two parts to be connected are then placed together with the projection or projections interposed between their adjacent surfaces. With the only contact between the adjacent surfaces of the parts being at the projections referred to, an electric current is passed between the parts by way of the projections, and at the same time pressure is brought to bear to urge the two parts together. This operation causes fusion of the material at the projections to permit the parts to move together under the applied pressure and their adjacent surfaces to engage. The material of the projections which is displaced during fusion thereof is received in recesses or so-called "flash pockets" previously formed or provided adjacent the projections. During the welding operation, therefore, the two parts to be connected can come together under the applied pressure, with their adjacent surfaces engaging at every point. While this method has been satisfactory as far as the strength of the connection between the parts is concerned, the requirements for machining or otherwise forming the projections and the flash pockets is expensive, and does not lend itself readily to mass production.

With the foregoing in mind, it is one of the objects of my invention to provide an element for connecting two parts together by projection welding, and in such a way as to avoid a requirement for expensive machining of the surfaces, and which will lend itself readily to economical mass production.

Other objects and advantages will hereinafter appear.

In accordance with my invention, an element, separate from the two parts to be welded together, is provided with the required projection or projections, and the so-called flash pockets for receiving the material of the projections displaced during the welding operation. This element is placed between the two parts to be connected, with its projections holding these parts spaced slightly from the respective adjacent surfaces of the element. Upon the simultaneous application of pressure and current, the material of the element forming the projections is caused to fuse and to become a common connecting part between the adjacent surfaces of the two parts to be welded. Under the applied pressure during the welding operation, the surfaces of the two parts referred to engage uniformly with the respective opposite surfaces of the connecting element.

My invention resides in the improved construction of the character hereinafter described and claimed.

For the purpose of illustrating my invention, an embodiment thereof is shown in the drawing, wherein Figure 1 is an elevational, sectional view, illustrating the manner in which my improved connecting element is used to weld two parts together, the section being taken on the line 1—1 in Fig. 3;

Figure 1:
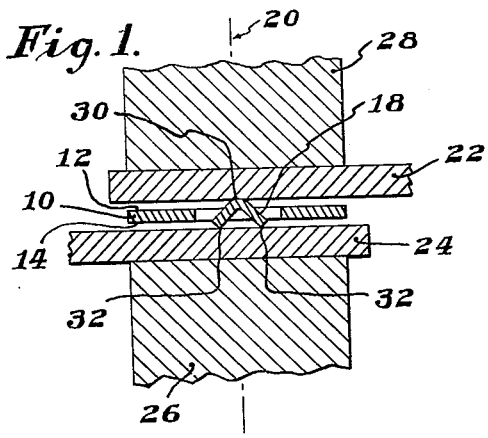
Figure 3:
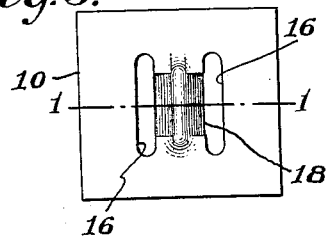
Fig. 3 is a top plan view of the connecting element in Fig. 1.
Figure 4:
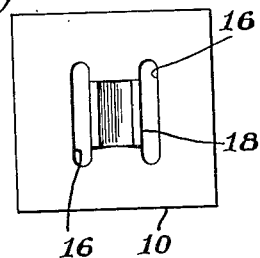
Fig. 4 is a bottom plan view of the connecting element in Fig. 1.

With reference to Figs. 1, 3 and 4, the connecting element constructed in accordance with my invention is designated by the reference numeral 10, and is shown as being in the form of a rectangular plate having the two sides 12 and 14.

The plate 10 is provided with a pair of holes 16 spaced with respect to each other to leave a part 18 of the material bridging the holes.

The part 18 is bent in the form of a V, as more clearly shown in Fig. 1, with the sides of the V disposed on opposite sides of a plane 20 perpendicular to the element 10. The free ends of the V extend slightly beyond the side or surface 14 of the element 10, and the angle end of the V extends slightly beyond the side or surface 12 of the element.

It is proposed to make the element 10 complete in a single operation by die stamping.

Figure 2:
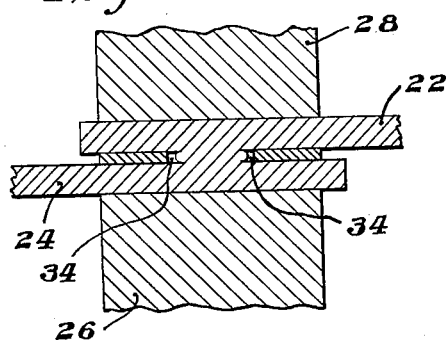
Fig. 2 is a view similar to Fig. 1, illustrative of conditions after the pressure and current has been applied to complete the welding operation.

In welding together two parts or plates 22 and 24, for example, they are placed between the two copper electrodes 26 and 28 of an electric press-welder of conventional design, with the connecting element 10 disposed between their adjacent surfaces as shown in Fig. 1. Upon the simultaneous application of pressure and current, fusion begins at the linear edges or projections 30 and 32, and the material of the part 18 becomes substantially integral with the adjacent surfaces of the parts 22 and 24, as represented in Fig. 2.

The material of the projections from the opposite surfaces of the element 10 is displaced during the welding operation, and is received by the recesses or flash pockets 34 provided by the holes 16. This action permits the surfaces of the parts 22 and 24 to engage evenly the respective adjacent surfaces 12 and 14 of the element 10 under the applied pressure.

It is important, in my improved construction, that the parts 18 be bent out of and at an acute angle to the body portion of the element 10. When the bent-out part is V-shape, there are provided the three linear edges 30 and 32, the edge 30 being disposed on the side 12 of the element 10, the other two edges 32 being disposed on the other side 14 of this element and in a plane parallel thereto. During the welding operation, therefore, there is initially only linear contact at opposite sides of the element 10, i. e., along the linear edges 30 and 32.

Figure 5:
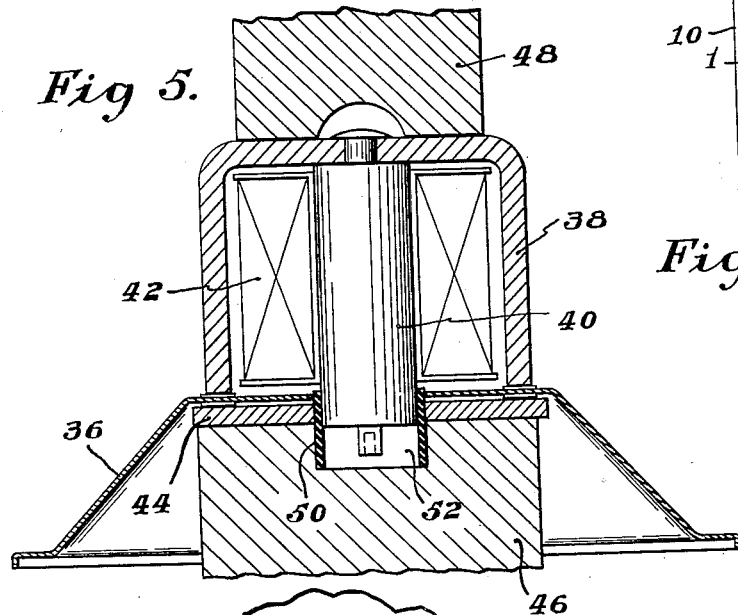
Fig. 5 is a central, elevational, sectional view of an assembly of parts for a loud speaker, illustrative of the manner in which my invention can be practiced to weld these parts together in a single operation.
Figure 6:
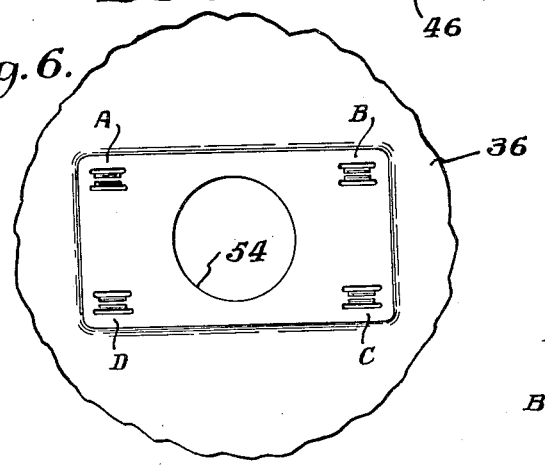
Fig. 6 is a fragmentary, plan view of the cone housing in Fig. 5.

In Figs. 5 and 6, my improved construction is shown embodied in the cone housing 36 for a loud speaker. The cone housing is punched and shaped at A, B, C and D in the same manner as the element 10 in Figs. 3 and 4. The magnetic yoke 38, with its associated core 40 and coil 42, is placed in position, with the cone housing and a yoke plate 44, between the copper electrodes 46 and 48 of a press-welder, as shown in Fig. 5. In placing these parts in position, a sleeve 50 of insulating material is placed within a recess 52 in the electrode 46, and has a nice fit over the adjacent end of the core 40 and in a central opening 54 in the cone housing. The sleeve 50, therefore, operates to center the parts.

Upon the simultaneous application of pressure and current by the electrodes, the welding action takes place in the same manner explained above in connection with Figs. 1 to 4, to weld the three parts 36, 38 and 44 together at the four points A, B, C and D, in a single operation.

By shaping the part 18 of the connecting element 10 in the form of a V disposed as shown, it is given substantial strength in the proper direction to permit a relatively great amount of pressure to be built up before this part is flattened out, as shown in Fig. 2, during the welding operation. This produces a stronger connection for the reason that as the parts are forced together, and the current applied, the connecting part 18 acts to break away any oxide coating on the surfaces which might otherwise interfere with a good fusion of the material.

It will be understood that various modifications within the conception of those skilled in the art are possible without departing from the spirit of my invention or the scope of the claims.

I claim as my invention:

1. As an article of manufacture, an element for connecting two parts together by projection welding, said element having two sides and being provided with at least one pair of holes spaced with respect to each other leaving part of the material of said element bridging said holes, said part being bent so that its surfaces are substantially in planes at an acute angle to the respective opposite sides of said element whereby some of the bent part projects beyond the surfaces at opposite sides of said element.

2. As an article of manufacture, an element for connecting two parts together by projection welding, said element having two sides and being provided with at least one pair of holes spaced with respect to each other leaving part of the material of said element bridging said holes, said part being bent in the form of a V with the sides thereof on opposite sides of a plane perpendicular to said element and with the free ends of the V extending beyond the surface of said element on one side and with the angle end of the V extending beyond the surface of said element on the other side thereof.

3. As an article of manufacture, an element for connecting two parts together by projection welding, said element having two sides and a part bent out of and at an acute angle to the body portion of said element, the bent-out part having an outer edge disposed substantially in a plane parallel to the adjacent side of said element whereby there is initially only substantially linear contact at said edge during the welding operation, said element being provided with a recess adjacent said edge for receiving the material of the bent part as the same is fused and flattened out between the two parts during the welding operation.

4. As an article of manufacture, an element for connecting two parts together by projection welding, said element having two sides and a part bent substantially in the form of a V out of the body portion of said element to provide two edges disposed on the same side of said element and substantially in a plane parallel to said side whereby there is initially only substantially linear contact at said edges during the welding operation, said element being provided with recesses adjacent said edges for receiving the material of the bent part as the same is fused and flattened out between the two parts during the welding operation.

5. As an article of manufacture, an element for connecting two parts together by projection welding, said element having two sides and a part bent substantially in the form of a V out of the body portion of said element to provide three linear edges substantially parallel to each other, one of said edges being disposed on one side of said element, the other two edges being disposed on the other side of said element and in a plane substantially parallel thereto, whereby there is initially only substantially linear contact at opposite sides of said element during the welding operation, said element being provided with recesses adjacent said edges for receiving the material of the bent part as the same is fused and flattened out between the two parts during the welding operation.

FREDERICK L. CREAGER.